ര്‍2,723,993

PREPARATION OF AROMATIC OXY-ALIPHATIC CARBOXYLIC ACIDS

Kenneth W. Richardson, Akron, Ohio, assignor to Columbia-Southern Chemical Corporation, Allegheny County, Pa., a corporation of Delaware No Drawing. Application September 19, 1952, Serial No. 310,550

5 Claims. (Cl. 260—521)

This invention relates to improvements in the process of manufacturing aromatic oxy-aliphatic carboxylic acids by condensation of salts of a phenol and a saturated chloroaliphatic carboxylic acid. It is particularly related to the production of halophenoxy acetic acids such as the commercially important herbicides, 2,4-dichlorophenoxy acetic acid and 2,4,5-trichlorophenoxy acetic acid.

The preparation of these aromatic oxy-aliphatic carboxylic acids conventionally involves the reaction of alkali metal salts of a phenol and a saturated monochloroaliphatic acid notably monochloroacetic in an aqueous reaction mixture. Thus, 2,4,5-trichlorophenoxy acetic acid is manufactured by reacting 2,4,5-trichlorophenate with monochloroacetate in an aqueous solution of sodium hydroxide.

It has been recognized that the performance of such condensation in aqueous solutions has certain disadvantages. The presence of water in the reaction mixture is unsatisfactory since it reduces yields, the reaction time is prolonged, and it requires handling of larger volumes of materials. All these factors reduce the capacity of a given installation and materially increase the operating costs per unit quantity of product.

Relatively large volumes of water, however, have heretofore been considered essential in performing the condensation. Sodium salts of aromatic oxy-aliphatic carboxylic acids such as sodium 2,4,5-trichlorophenoxy acetate are insoluble in the reaction medium, and as the reaction proceeds the mixture becomes a thick, unmanageable solid mass which not only prevents completion of the reaction, but makes further processing difficult. Thus, in order to provide a reaction slurry of sufficient fluidity, it has been common to add water thereto.

Various suggestions as to how such difficulties may be overcome are described in the literature. U. S. Letters Patent 2,598,692 granted June 3, 1952 to Gustav J. Henrich describes one proposed solution wherein a minimum amount of water is employed as the reaction commences and additional water is added during the course of the reaction. According to this patent, about 19 to 50 moles of water per mole of sodium monochloracetate is used initially in the reaction mass and water is added to the reaction proceeds until at least about 74 moles of water per mole of the acetate is ultimately employed.

As can readily be appreciated, such process still requires the use of substantial quantities of water in the reaction mixture. It, therefore, does not altogether overcome the disadvantage attendant to the use of water, i. e., prolonged reaction periods and reduced yields.

According to the present invention, it is possible to reduce the overall amount of water required to carry out the condensation with the result that increased yields and accelerated reaction rates may be achieved. This is accomplished by reacting the two reactants, the salts of a phenol and saturated chlorocarboxylic acid, in a relatively small quantity of water, and removing a portion of the solid phase from the reaction mixture during the course of the reaction. It has been found that by removing at least a portion of the solid phase present in the reaction mixture as the reaction proceeds, it is possible to reduce the amount of water initially required according to the processes described in the literature and that it is also unnecessary to further dilute the reaction mixture with additional increments of water as the reaction proceeds.

The actual practice of this invention may be achieved by a variety of expedients. For example, 2,4,5-trichlorophenoxy acetic acid is prepared in accordance with this invention by charging a reactor with approximately equi-molecular amounts of 2,4,5-trichlorophenol and monochloroacetic acid, sufficient sodium hydroxide to convert each reactant to its respective sodium salt, and about 13 moles of water per mole of monochloroacetic acid. This mixture is reacted at elevated temperatures, e. g., 95 to 105° C., for several hours, generally from 1½ to 5 hours with agitation.

As the reaction proceeds, the sodium salt of 2,4,5-trichlorophenoxy acetic acid precipitates and a slurry forms which becomes progressively thicker. When the slurry becomes difficult to agitate, a portion of the solid phase, is removed from the mixture while the reaction continues. This may be accomplished by periodically or continuously withdrawing a portion of the reaction mixture and removing the solid phase therefrom. The liquid phase recovered from this separation may be returned to the reaction mixture, if desired.

At the conclusion of the reaction, the separated solid phase and product remaining in the reaction mixture may be combined and processed together to recover the product in any desired degree of purity by recourse to known purification expedients.

It should be noted that the process of this invention requires the presence of only a minimum amount of water throughout the entire reaction period. It has the further advantage, that recycle of the liquid phase during the course of the reaction (if it is utilized) increases the recoverable yields.

The exact manner in which portions of the solid product may be removed from the reaction mixture depends to a great extent on a variety of factors including the particular reactants, reaction conditions such as temperature, and size of operations. On a large scale, a portion of the reaction mixture may be continuously removed from the reaction zone and continuously filtered, with continuous recycle of the filtrate. Likewise, this step may be effected in a semi-continuous manner, e. g., the portion of reaction mixture may be continuously removed from the reaction zone, and the filtration may be carried out batchwise. It is also possible to merely remove a portion of reaction mixture whenever necessary as a completely batchwise operation. Thus, it can be seen that a variety of expedients can be employed to remove a portion of the solid phase from the reaction mixture within the scope of this invention. For example, it is possible to centrifuge, instead of filter, to effect the removal of the solid phase.

In batchwise removal, the most advantageous time or times to remove a portion of the solid phase during the reaction will vary considerably, depending, for example, on the initial quantity of water present and the particular product. It is to be remembered that the various products within the scope of this invention are insoluble to varying degrees in the reaction mixture. For example, the sodium salt of 2,4-dichlorophenoxy acetic acid is more soluble than the corresponding salt of 2,4,5-trichloroacetic acid. In the case of the more soluble salt, fewer withdrawals are generally required. Stated otherwise, the overall amount of product percentage-wise that must be withdrawn from the reaction mass is an inverse function of the solubility thereof.

Similarly, if continuous or semi-continuous removal techniques are employed, the rate of removal of the product should be correlated with the solubility of the product in a manner consistent with the foregoing discussion.

It is to be further understood that any manner in which the withdrawal of solid phase from the reaction mixture is effected is within the scope of this invention.

The liquid phase recovered from the separation of the solid phase should be returned to the reaction zone for best results. Recycle of this liquid not only increases recoverable yields, but also aids in maintaining the reaction mixture as a less thick slurry. It reduces the total quantity of solid that must be removed during the course of the reaction.

The reaction materials may be charged to the reaction zone in any of several ways. Salts of the respective phenols and chlorocarboxylic acid may be preformed and charged to the reaction zone along with water. Alternatively, the phenol and chlorocarboxylic acid may be placed in the reaction zone and converted to their salts by addition of aqueous sodium hydroxide. Also, sodium hydroxide and the chlorocarboxylic acid may be added to the salt of the phenol.

In practice, it is preferred to employ a ratio of 0.8 to 2 moles of phenol per mole of acid reactant. Sufficient sodium hydroxide is used to provide the respective salts of the two reactants. Sometimes an excess of caustic, such as a 5 mole per cent excess, is beneficial.

The invention normally requires that the reaction mixture have adequate fluidity as the reaction commences. As a general rule, about 10 to 20 moles of water per mole of chlorocarboxylic acid is employed to provide this adequate fluidity. A preferred procedure requires 13 moles of water per mole of acid. It is possible to operate with even less water requirements at elevated temperatures where the product is more soluble. This necessitates performing the reaction in an autoclave or other high pressure apparatus. Likewise, the invention may be practiced while employing in excess of 20 moles of water per mole of chlorocarboxylic acid. However, as already explained, it provides optimum operating conditions when the water requirement is kept at a minimum, i. e. less than 20 moles.

The invention may be practiced with a wide variety of phenols including phenol, 2-chlorophenol, 3-chlorophenol, 2,4-dichlorophenol, 2,4,5-trichlorophenol; higher chlorinated phenols, corresponding halophenols including bromophenols; alkyl substituted phenols such as 2-ethylphenol, 2-methylphenol, 3-isopropylphenol and the like; alkylhalophenols such as 2-chloro 4-methylphenol; nitrophenols including 2-nitrophenol, 4-nitrophenol; alpha naphthol, betanaphthol, 2-phenylphenol, and alkoxyphenols including methoxyphenol, 2,6-dimethoxyphenol.

Saturated chloroaliphatic carboxylic acids that are useful include chloroacetic acid, alpha chloropropionic acid, betachloropropionic acid, betachlorobutyric. Any saturated chloroaliphatic carboxylic acid capable of forming a water-soluble salt can be employed.

The following examples illustrate the invention:

*Example I*

2600 pounds (13.15 moles) of trichlorophenol and 1000 pounds of 50 per cent by weight aqueous sodium hydroxide are charged in that order to a steam jacketed reaction kettle. The reaction mixture is continuously agitated and the reaction mixture temperature is raised to 100° C. by the steam in the jacket. 3500 pounds of 40 per cent by weight aqueous sodium chloroacetate is added slowly to the reaction mixture. The entire reaction period after charging consumes 3 hours.

After the reaction has proceeded for 10 minutes, continuous withdrawal of a portion of the reaction mixture is begun. The rate of withdrawal is such that 15 per cent by weight of the complete reaction mixture is withdrawn per hour. The withdrawn reaction mixture is filtered, and the filtrate is returned immediately to the kettle.

At the close of the reaction, the contents of the kettle and the filter cake are combined and washed with dilute hydrochloric acid to form the acid product from the sodium salt thereof. The resulting slurry is then filtered and the filter cake is substantially pure 2,4,5-trichlorophenoxy acetic acid. The filtrate is treated to recover unreacted trichlorophenol by steam distillation for future use. A yield of about 84 per cent based on the chloroacetic acid is obtained.

*Example II*

The procedure of Example I was repeated except that dichlorophenol is employed. The amount of reactants employed were 4,685 pounds of dichlorophenol, 2,240 pounds of 50 per cent by weight aqueous sodium hydroxide, and 8,125 pounds of 38 per cent by weight aqueous sodium chloroacetate. A yield of about 86 per cent based on the amount of chloroacetate employed is obtained.

Although the present invention has been described with reference to the specific details of certain embodiments thereof, it is not intended that such details shall be regarded as limitations upon the scope of the invention, except insofar as included in the accompanying claims.

I claim:

1. In a method of preparing an aromatic oxyaliphatic carboxylic acid by condensation of a phenol and a chlorocarboxylic acid in an aqueous alkaline solution whereby to form a reaction slurry, the improvement which comprises limiting the overall amount of water in the reaction medium to less than 20 moles per mole of chlorocarboxylic acid and removing a portion of the solid phase of the slurry from the reaction zone as the condensation proceeds.

2. In a method of preparing an aromatic oxyalphatic carboxylic acid by condensation of a phenol and a chlorocarboxylic acid in an aqueous alkaline solution whereby to form a reaction slurry, the improvement which comprises limiting the overall amount of water in the reaction medium to less than 20 moles per mole of chlorocarboxylic acid and removing a portion of the reaction mixture from the reaction zone during the course of the condensation, separating the solid phase from said removed mixture, and returning the liquid phase obtained from said separation to the reaction zone.

3. In the method of preparing 2,4,5 trichlorophenoxy acetic acid by condensation of 2,4,5 trichlorophenol and chloracetic acid in an aqueous alkaline solution whereby solid sodium 2,4,5 trichlorophenoxy acetate is formed, the improvement which comprises limiting the overall amount of water to less than 20 moles of water per mole of chloroacetic acid and removing a portion of said acetate from the reaction zone during the reaction.

4. The method of claim 3 wherein a portion of the reaction mixture is removed from the reaction zone, the acetate is separated from said removed mixture, and the liquid phase remaining after the separation is returned to the reaction zone.

5. In the method of preparing 2,4-dichlorophenoxy acetic acid by condensation of 2,4-dichlorophenol and chloroacetic acid in an aqueous alkaline solution whereby sodium 2,4-dichlorophenoxy acetate is formed, the improvement which comprises limiting the overall amount of water in the reaction medium to less than 20 moles of water per mole of chloroacetic acid and removing a portion of said acetate from the reaction zone during the reaction.

References Cited in the file of this patent

UNITED STATES PATENTS

| Number | Name | Date |
|---|---|---|
| 2,375,731 | Caldwell et al. | May 8, 1945 |
| 2,598,692 | Henrich | June 3, 1952 |
| 2,637,639 | Talbot et al. | May 5, 1953 |
| 2,656,382 | Kulza et al. | Oct. 20, 1953 |

FOREIGN PATENTS

| Number | Country | Date |
|---|---|---|
| 573,479 | Great Britain | Nov. 22, 1945 |